Oct. 6, 1959     I. K. WEISS     2,907,577

AIR SUSPENSION ASSEMBLY FOR TANDEM AXLE VEHICLE

Filed Nov. 30, 1955     3 Sheets-Sheet 2

INVENTOR
Irwin K. Weiss
BY
J. C. Thorpe
ATTORNEY

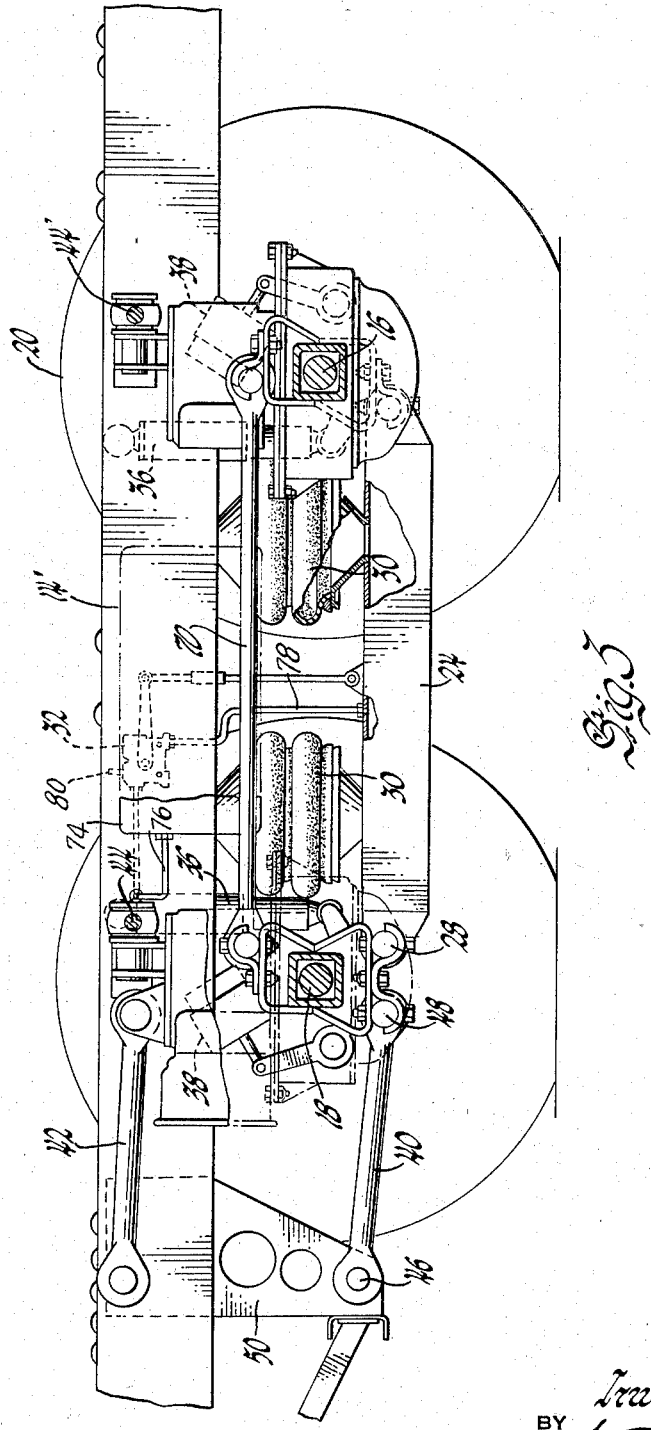

2,907,577

AIR SUSPENSION ASSEMBLY FOR TANDEM AXLE VEHICLE

Irwin K. Weiss, Birmingham, Mich., assignor to General Motors Corporation, Detroit, Mich., a corporation of Delaware Application November 30, 1955, Serial No. 550,043

4 Claims. (Cl. 280—104.5)

This invention concerns an air suspension system for tandem axle vehicles, particularly trucks, and has for its principal objects—

To provide such a system for the indicated application which is readily installed and serviced at minimum expense.

To provide such a system which is of simple design, yet highly effective in operation.

To provide apparatus for air suspending a vehicle body over tandem axles, which apparatus in operation permits maximum axle motion with minimum air spring deflection when one of the axles is caused to move relative to the other, yet, at the same time, allows for maximum spring deflection at a given load when the axles are displaced simultaneously and to the same extent.

A still further object is to provide a system which reduces to a minimum the load on the body joints of the vehicle from braking and acceleration reactions.

Other objects and features of the invention will become apparent from the further description which will proceed with reference to the accompanying drawings showing a preferred embodiment of the invention.

In the drawings,

Figure 3 is a view taken on the line indicated in Figure 2.

Figure 1:
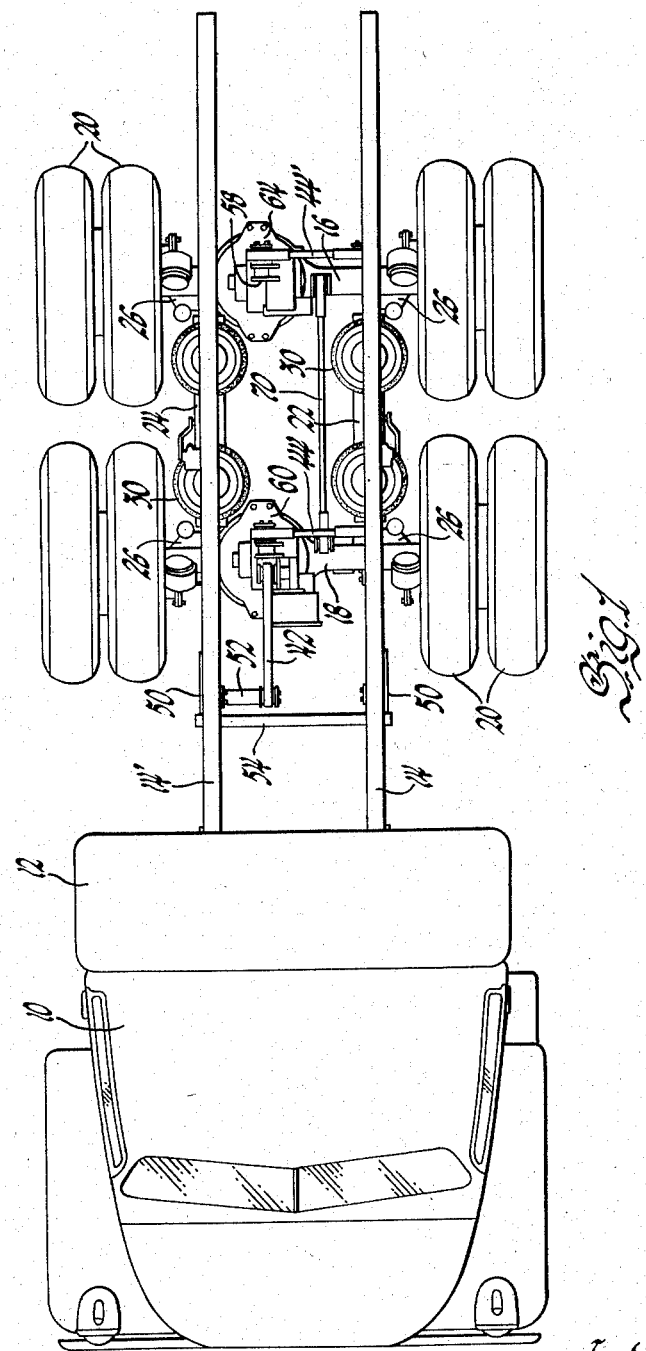
Figure 1 is a plan view of a vehicle conforming to the invention, certain parts being omitted for clarity.

In Figure 1, the numeral 10 indicates the cab of the vehicle, 12 a sleeper. Disposed under the frame side rails 14, 14′ are axles 16 and 18, mounting dual wheels 20, each axle being shown as a driving axle with the propeller shafts omitted.

Figure 2:
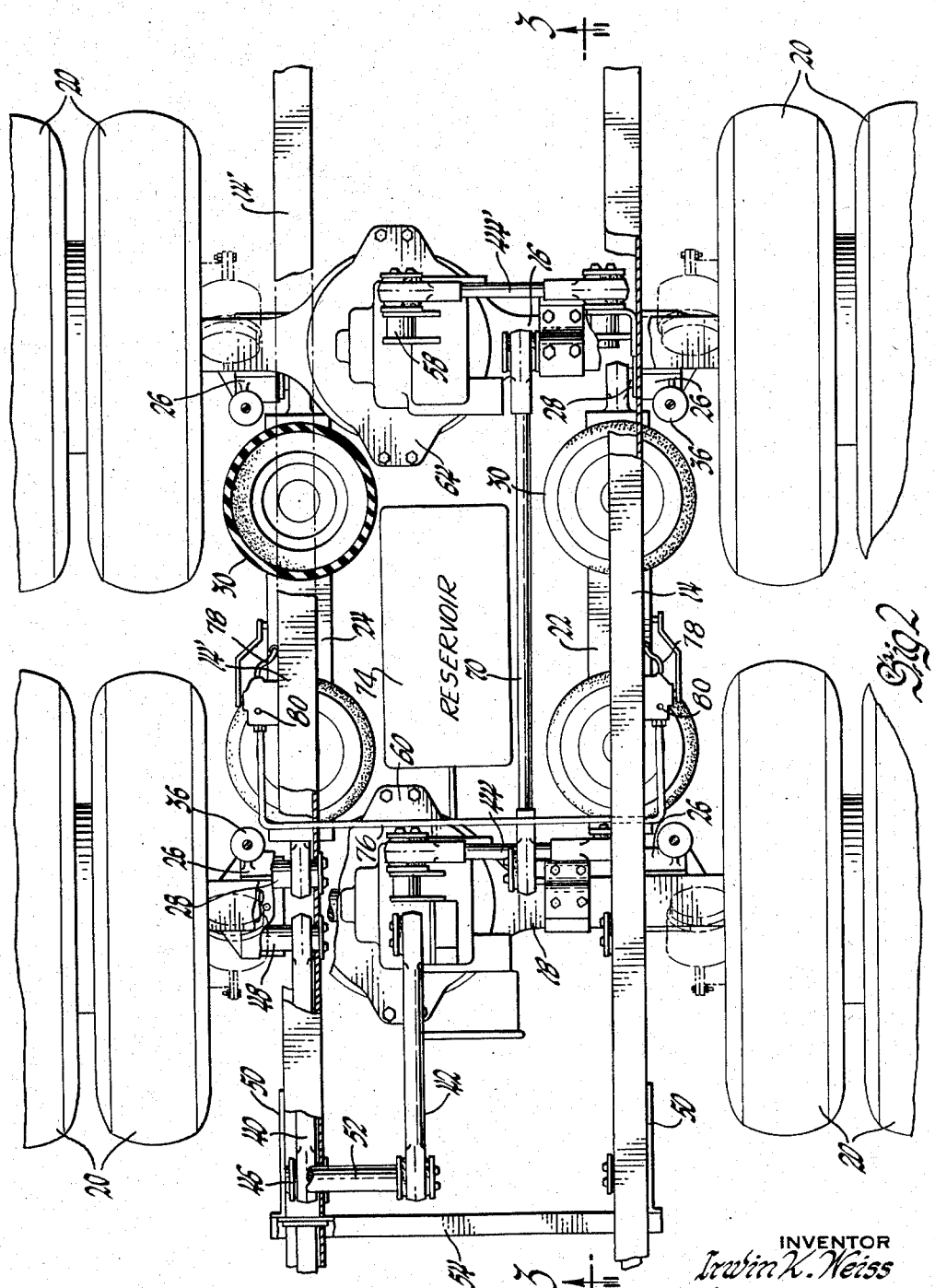
Figure 2 is an enlarged plan view of the rear end of the vehicle, with certain of the parts being shown broken away and/or in section.

Referring now to Figures 2 and 3, there will be seen disposed under the side rails 14, 14′, beams 22, 24 interconnecting the tandem axles via mountings 26 suitably fixed to the axle housings. As shown, each beam has an eye at either end accommodating a stud 28 integral with or fixedly secured to the mountings 26. Rubber bushings may be disposed in the eyes around the studs, dispensing with the need for lubrication.

Beams 22, 24 will be seen as under-supporting air bellows or springs 30 interconnecting the beams and the rails 14, 14′. These beams are adapted to be supplied with compressed air from a tank 74 maintained at a predetermined pressure by a suitable compressor, not shown. The admission of air to the beams 22, 24 is under the control of levelling valves 32, each such valve having connections 76 and 78 extending, respectively, to the tank 74 and the corresponding beam and further having a vent 80. The nature and operation of the levelling valves will be made clear by reference to U.S. Patent 2,670,201. Suffice it to say here, that these valves serve to maintain the vehicle body at a constant level irrespective of load by charging or exhausting air from the beams as required incident to a load change. As should be apparent from the drawings, particularly Figure 3, deflection and rebound of each set of the bellows 30 is marked by interchange of air between the bellows and the corresponding beam.

Shock absorbers 36 may be of a conventional type and the same is true of cylinders 38 housing the pistons actuated on depression of the air brake pedal by the operator of the vehicle.

As will be readily understood, the air springs 30 are capable of taking only vertical loads, hence the system must comprise other means for absorbing braking, acceleration and lateral thrust loads. These means include forward torque rods 40 and 42, disposed longitudinally of the vehicle in general parallelism, and transverse rods 44, 44′.

Rods 40 will be observed as having eyes at their ends fitting over studs 46, 48, studs 46 being fixedly secured in brackets 50 depending from the side rails 14, 14′, studs 48 being similarly fixedly secured to the previously mentioned mountings 26 carried by the axle 18. All of these connections may, of course, be rubber bushed.

The rod 42 is disposed at a higher level and inwardly of the rods 40. Such rod (Fig. 1) is connected at one end to a mounting 52 seen extending from the side rail 14′ rearward of a brace 54 interconnecting the brackets 50. The other end of the rod 42 has a bracket connection with the differential housing 60, the bracket carrying the usual stud over which the eye of the rod is fitted. The inner end of transverse thrust member 44 is also connected to this bracket while the eye at the outer end of such member is fitted over a stud secured to the rail 14. Transverse thrust rod 44′, which has relation to the trailing axle 16, extends between a bracket 58 secured to the differential housing 64 and a stud member fastened to the last mentioned rail.

In addition to the rods above, there is included in the system, a rod 70 interconnecting the axles 16 and 18. This rod controls torque reaction of the rear axle from braking, i.e. prevents axle wind-up, and provides for unity of operation of the two axles. It further serves the purpose of maintaining proper alignment of the axles.

Torque rods 40 and 42 control braking and driving torque reaction of both axles, assist in controlling side sway, and maintain the geometry and alignment of the axles.

The transverse rods 44, 44′ also assist in controlling side sway and additionally operate to maintain the transverse or lateral positioning of the axles.

It will, of course, be immediately recognized that the system as represented is susceptible of substantial modification without departure from the scope of the invention. Thus, in the case of a tandem axle vehicle where only one of the axles is a driving axle, the axles may be loaded unequally with the heavier load on the driving axle for improved traction. This may be accomplished by using bellows of different sizes on the same beam, the larger bellows supporting the greater load at the same air pressure, or by non-symmetrical location of the bellows on the beam.

By the nature of the system, as shown, any of the bellows acts as a reservoir for its mate on the same beam when only one wheel or axle is displaced. This results in a lower spring rate and corresponding ride improvement during articulation and a higher spring rate to resist side sway.

Having thus described and illustrated my invention, what I claim is:

1. An air suspension assembly for a vehicle having tandem rear axles, said assembly comprising a pair of beams supported by and between the axles and mounting air springs interconnecting the beams and the frame of the vehicle, a pair of levelling valves secured to the vehicle frame each having a link for connection to one of said beams centrally of the length thereof, a longitudinal thrust member interconnecting said axles and disposed at one side of the center line of the vehicle frame, a second longitudinal thrust member ahead of the forward of said axles and linking such axle to the frame of the vehicle, said second longitudinal thrust member being disposed at the other side of the center line of the vehicle frame and acting with said first mentioned thrust member to transmit longitudinal reactions of the rearward of said axles to the frame, a pair of transverse thrust members each linking one of said axles to the frame of the vehicle, and a longitudinal thrust member extending forwardly of each said beams for connection to the vehicle frame.

2. An air suspension assembly for a vehicle having tandem rear axles with wheel means at the ends of each axle, said assembly comprising a pair of beams supported by and between the axles, each of said beams mounting a pair of air springs, one at each end thereof, interconnecting the beam and the frame of the vehicle, a pair of levelling valves secured to the vehicle frame each having a link for connection to one of said beams, a longitudinal thrust member interconnecting said axles, a second longitudinal thrust member ahead of the forward of said axles and connecting such axles to the frame of the vehicle, said second longitudinal thrust member acting with said first thrust member to transmit longitudinal reactions of the rearward of said axles to the vehicle frame, and a pair of transverse thrust members each linking one of said axles to the vehicle frame, said beams being adapted for connection to a source of air pressure and opening to said springs so that deflection and rebound of the springs is marked by air interchange between the springs and beams, said assembly being further characterized in that when only one of the said wheel means at a side of the vehicle is displaced the air spring associated with the other said wheel means at such side acts as reservoir space for the affected air spring.

3. An air suspension assembly for a vehicle having tandem rear axles with wheel means at the ends of each axle, said assembly comprising a pair of beams supported by and between the axles, each of said beams mounting a pair of air springs, one at each end thereof, interconnecting the beam and the frame of the vehicle, levelling means associated with the vehicle frame and each said beam, a longitudinal thrust member interconnecting said axles and disposed at one side of the center line of the vehicle frame, a second longitudinal thrust member ahead of the forward of said axles and linking such axle to the frame of the vehicle, said second longitudinal thrust member being disposed at the other side of the center line of the vehicle frame and acting with said first thrust member to transmit longitudinal reactions of the rearward of said axles to the vehicle frame, a pair of transverse thrust members each linking one of said axles to the frame of the vehicle, and a longitudinal thrust member extending forwardly of each said beam for connection to the vehicle frame, said beams being adapted for connection to a source of air pressure and opening to said springs so that deflection and rebound of the springs is marked by air interchange between the springs and beams, said assembly being further characterized in that when only one of the said wheel means at a side of the vehicle is displaced the air spring associated with the other said wheel means at such side acts as reservoir space for the affected air spring.

4. An air suspension assembly for a vehicle having tandem rear axles with wheel means at the ends of each axle, said assembly comprising a pair of beams supported by and between the axles, each of said beams mounting a pair of air springs, one at each end thereof, interconnecting the beam and the frame of the vehicle, a pair of levelling valves secured to the vehicle frame each having a link for connection to one of said beams centrally of the length thereof, a longitudinal thrust member interconnecting said axles and disposed at one side of the center line of the vehicle frame, a second longitudinal thrust member ahead of the forward of said axles and linking such axle to the frame of the vehicle, said second longitudinal thrust member being disposed at the other side of the center line of the vehicle frame and acting with said first thrust member to transmit longitudinal reactions of the rearward of said axles to the vehicle frame, a pair of transverse thrust members each linking one of said axles to the frame of the vehicle, and a longitudinal thrust member extending forwardly of each said beam for connection to the vehicle frame, said beams being adapted for connection to a source of air pressure and opening to said springs so that deflection and rebound of the springs is marked by air interchange between the springs and beams, said assembly being further characterized in that when only one of the said wheel means at a side of the vehicle is displaced the air spring associated with the other said wheel means at such side acts as reservoir space for the affected air spring.

References Cited in the file of this patent

UNITED STATES PATENTS

| | | |
|---|---|---|
| 1,761,135 | Le Moon | June 3, 1930 |
| 2,065,924 | Knox | Dec. 29, 1936 |
| 2,691,420 | Fox | Oct. 12, 1954 |
| 2,742,301 | Pointer | Apr. 17, 1956 |
| 2,743,939 | Reid | May 1, 1956 |
| 2,771,303 | Frazier | Nov. 20, 1956 |

FOREIGN PATENTS

| | | |
|---|---|---|
| 365,103 | France | June 18, 1906 |